United States Patent
Lee et al.

(10) Patent No.: US 8,018,541 B2
(45) Date of Patent: Sep. 13, 2011

(54) ARRAY SUBSTRATE FOR IN-PLANE SWITCHING MODE LIQUID CRYSTAL DISPLAY DEVICE

(75) Inventors: Min-Jic Lee, Gumi-si (KR); Seung-Chan Shin, Daegu (KR)

(73) Assignee: LG Display Co., Ltd., Seoul (KR)

( * ) Notice: Subject to any disclaimer, the term of this patent is extended or adjusted under 35 U.S.C. 154(b) by 224 days.

(21) Appl. No.: 12/585,560

(22) Filed: Sep. 17, 2009

(65) Prior Publication Data
US 2010/0149445 A1    Jun. 17, 2010

(30) Foreign Application Priority Data
Dec. 17, 2008   (KR) .................. 10-2008-0128827

(51) Int. Cl.
*G02F 1/1343*   (2006.01)
(52) U.S. Cl. ............... 349/38; 349/33; 349/41; 349/42; 349/43
(58) Field of Classification Search ............. 349/33, 349/38, 41, 42, 43
See application file for complete search history.

(56) References Cited

U.S. PATENT DOCUMENTS

| | | | |
|---|---|---|---|
| 5,949,511 A * | 9/1999 | Park | 349/139 |
| 7,206,052 B2 * | 4/2007 | Hong et al. | 349/141 |
| 2001/0002146 A1 * | 5/2001 | Komatsu | 349/141 |

* cited by examiner

*Primary Examiner* — Jennifer Doan
(74) *Attorney, Agent, or Firm* — McKenna Long & Aldridge LLP

(57) ABSTRACT

An array substrate for IPS mode LCD device includes first and second gate lines on a substrate including first and second pixel regions; a first common connection pattern in an upper side of each of the first and second pixel regions; first and second outmost common electrodes extending from the first common connection pattern; first and second data lines crossing the first and second gate lines, the first and second pixel regions adjacent to each other along the first and second data lines; a TFT connected to the first gate line and the first data line pixel electrodes; a pixel connection pattern connected to the drain electrode common electrodes alternately arranged with the pixel electrodes; and a second common connection pattern at a lower side of the pixel regions and connected to the second outmost common electrode.

16 Claims, 6 Drawing Sheets

ARRAY SUBSTRATE FOR IN-PLANE SWITCHING MODE LIQUID CRYSTAL DISPLAY DEVICE

The present application claims the benefit of Korean Patent Application No. 2008-0128827 filed in Korea on Dec. 17, 2008, which is hereby incorporated by reference for all purposes as if fully set forth herein.

BACKGROUND OF THE INVENTION

1. Field of the Invention

The present invention relates to an in-plane switching (IPS) mode liquid crystal display (LCD) device, and more particularly, to an array substrate for an IPS mode LCD device capable of having a sufficient storage capacitance, improving a display image quality and reducing production cost.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by application of an electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics such as high resolution and display of moving images, the AM-LCD device has been widely used.

The AM-LCD device includes an array substrate, a color filter substrate and a liquid crystal layer interposed therebetween. The array substrate may include a pixel electrode and TFT, and the color filter substrate may include a color filter layer and a common electrode. The AM-LCD device is driven by an electric field between the pixel electrode and the common electrode resulting in excellent properties of transmittance and aperture ratio. However, since the AM-LCD device uses a vertical electric field, the AM-LCD device has a bad viewing angle.

An in-plane switching (IPS) mode LCD device may be used to resolve the above-mentioned limitations. The related art IPS mode LCD device includes a color filter substrate, an array substrate facing the color filter substrate, and a liquid crystal layer interposed therebetween. Both common and pixel electrode for driving the liquid crystal layer are formed on the array substrate. On the color filter substrate, a black matrix and a color filter layer are formed without the common electrode. The liquid crystal layer is driven by a horizontal electric field induced between the common and pixel electrodes.

FIGS. 1A and 1B are cross-sectional views showing turned on/off conditions of an IPS mode LCD device according to the related art. As shown in FIG. 1A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by the horizontal electric field, the IPS mode LCD device has a characteristic of a wide viewing angle. FIG. 1B shows a condition when the voltage is not applied to the IPS mode LCD device. Because an electric field is not generated between the common and pixel electrodes 17 and 30, the arrangement of liquid crystal molecules 11 is not changed.

FIG. 2 is a plan view of a portion of an array substrate for the related art IPS mode LCD device. In FIG. 2, the array substrate 10 for the related art IPS mode LCD device includes a gate line 12, a common line 16, a data line 24, a thin film transistor (TFT) Tr, a plurality of common electrodes 17 and a plurality of pixel electrodes 30. The common line 16 is parallel to and spaced apart from the gate line 12, and the data line 24 crosses the gate line 12 such that a pixel region P is defined on the array substrate 10. The TFT Tr is disposed at a crossing portion of the gate and data lines 12 and 24 and includes a gate electrode 14, a semiconductor layer 20, a source electrode 26 and a drain electrode 28. The gate electrode 14 and the source electrode 26 are connected to the gate and data lines 12 and 24, respectively.

The pixel electrodes 30 in the pixel region P are connected to the drain electrode 28 and spaced apart from each other. The common electrodes 17 are branched from the common line 16 and alternately arranged with the pixel electrodes 30.

One pixel electrode 30, which is parallel to the data line 24, has a major axis along the data line 24 and a minor axis along the gate line 12. As shown in FIG. 3, which shows color filter patterns in the related art IPS mode LCD device, since a red color filter pattern R, a green color filter pattern G and a blue color filter pattern B are required for producing a color image, there are one red color filter pattern R, one green color filter pattern G and one blue color filter pattern B in adjacent three pixel regions P along the gate line 12. To obtain a pixel unit of one red color filter pattern R, one green color filter pattern G and one blue color filter pattern B, one gate line 12 and three data lines 24 are required. Namely, data lines 24 of triple as many as the gate line 12 are required.

A data signal applied to the pixel electrode 30 through the data line 24 should be applied to all pixel regions along one gate line at the same time with a variation in a voltage. Accordingly, for applying the data signal to many data lines, a driving circuit board having a complex circuit structure is required. In addition, a plurality of flexible printed circuit (FPC) including a data driving integrated circuit (IC) chip for control and an electrical connection of the driving circuit board to the data line are required.

The data driving IC chip in the FPC is standardized such that a number of the data line controlled by one data driving IC chip is limited. Accordingly, when an image of high resolution is displayed or the IPS mode LCD device becomes larger, the FPC including much more data driving IC chip in proportion to a number of the increased pixel regions is required. As a result, there is an increase in production cost.

FIG. 4 is a schematic plan view showing the related art IPS mode LCD device with a driving circuit board. As shown in FIG. 4, assuming the related art IPS mode LCD device 60 has a predetermined resolution, six FPCs 67 including the data driving IC chip 64 for connecting the data line (not shown) on the array substrate 62 to the driving circuit board 70 are required.

SUMMARY OF THE INVENTION

Accordingly, the present invention is directed to an array substrate for an IPS mode LCD device and a method of fabricating the same that substantially obviates one or more of the problems due to limitations and disadvantages of the related art.

An object of the present invention is to provide an array substrate for an IPS mode LCD device having less FPCs such that production cost is reduced.

Another objection of the present invention is to provide an array substrate for an IPS mode LCD device having a sufficient storage capacitance.

Another objection of the present invention is to provide an array substrate for an IPS mode LCD device being capable of displaying a high quality image.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an in-plane switching mode liquid crystal display device includes first and second gate lines on a substrate including first and second pixel regions; a first common connection pattern in an upper side of each of the first and second pixel regions; first and second outmost common electrodes extending from ends of the first common connection pattern; a gate insulating layer on the first and second gate lines, the first common connection pattern and the first and second outmost common electrodes; first and second data lines on the gate insulating layer and crossing the first and second gate lines to define the first and second pixel regions, the first and second pixel regions being adjacent to each other along a direction of the first and second data lines; a thin film transistor in the first pixel region and connected to the first gate line and the first data line, the thin film transistor including a gate electrode, a semiconductor layer, a source electrode, and a drain electrode, the drain electrode extending to overlap the first outmost common electrode; a passivation layer on the first and second data lines and the thin film transistor and including a drain contact hole exposing a portion of the drain electrode and a first common contact hole exposing a portion of the second outmost common electrode; a plurality of pixel electrodes on the passivation layer and spaced apart from each other; a pixel connection pattern on the passivation layer and connecting one end of the pixel electrodes, the pixel connection pattern connected to the drain electrode through the drain contact hole, the pixel connection pattern overlapping the first and second outmost common electrodes and first and second portions of the first common connection pattern; a plurality of common electrodes on the passivation layer and alternately arranged with the pixel electrodes; and a second common connection pattern at a lower side of the pixel regions and on the passivation layer, the second common connection pattern connected to the second outmost common electrode through the first common contact hole and connecting one end of the common electrodes.

In another aspect of the present invention, an array substrate for an in-plane switching mode liquid crystal display device includes first and second gate lines on a substrate including first and second pixel regions; a first common connection pattern in an upper side of each of the first and second pixel regions; first and second outmost common electrodes extending from ends of the first common connection pattern; a gate insulating layer on the first and second gate lines, the first common connection pattern and the first and second outmost common electrodes; first and second data lines on the gate insulating layer and crossing the first and second gate lines to define the first and second pixel regions, the first and second pixel regions being adjacent to each other along a direction of the first and second data lines; a thin film transistor in the first pixel region and connected to the first gate line and the first data line, the thin film transistor including a gate electrode, a semiconductor layer, a source electrode, and a drain electrode, the drain electrode extending to overlap the first outmost common electrode; a passivation layer on the first and second data lines and the thin film transistor and including a drain contact hole exposing a portion of the drain electrode and a first common contact hole exposing a portion of the first common connection pattern; a plurality of pixel electrodes on the passivation layer and spaced apart from each other; a pixel connection pattern on the passivation layer and connecting one end of the pixel electrodes, the pixel connection pattern and connected to the drain electrode through the drain contact hole, the pixel connection pattern facing the first common connection pattern such that the pixel electrodes are disposed between the pixel connection pattern and the first common connection pattern; a plurality of common electrodes on the passivation layer and alternately arranged with the pixel electrodes; and a second common connection pattern overlapping the first common connection pattern and on the passivation layer, the second common connection pattern connecting one end of the common electrodes, the second common connection pattern connected to the first common connection pattern through the first common contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments, examples of which are illustrated in the accompanying drawings.

In comparison to the related art IPS mode LCD device, a pixel region of an array substrate for an IPS mode LCD device according to the present invention has a major axis along a gate line, i.e. a horizontal direction, and a minor axis along a data line, i.e. a vertical direction. Since a number of data lines is reduced with red, green and blue color filter patterns arranged in adjacent three pixel regions along the vertical direction, the IPS mode LCD device according to the present invention requires less flexible printed circuit (FPC) including a data driving IC chip. In comparison to the related art IPS mode LCD device, the IPS mode LCD device according to the present invention has triple gate lines and one-third data lines.

A gate signal applied to the gate line has only function of being turned on or off of a thin film transistor connected to the gate line. Since the gate signal having the same voltage is sequentially applied to the gate line, a gate driving circuit for controlling the gate signal requires simple elements, for example, a timing controller. Accordingly, even if a number of the gate lines is increased, a process for the gate driving circuit is not complicated and production cost is not increased. In this case, the device is normally operated by reducing an interval of applying the gate signal one-third as much as the interval of the related art device. For example, the gate driving circuit is driven in a shorten frequency 180 Hz in the IPS mode LCD device according to the present invention, while the gate driving circuit is driven in 60 Hz in the related art device. An FPC including a gate driving IC chip for the gate line may not be required. The gate line may receive the gate signal from a driving circuit board connected to the data line through an FPC including a data driving IC chip for the data line. In this case, a connection line for the gate line to the FPC is formed on a non-display region of the array substrate.

In the present invention, since a number of the data lines is reduced, a number of the FPCs including the data driving IC for the data line is also reduced.

Figure 1A:
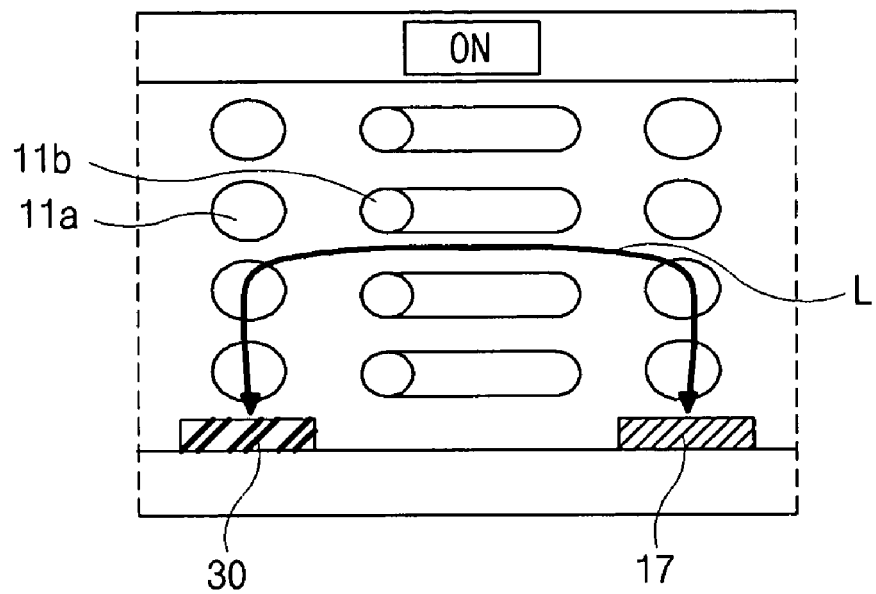
FIGS. 1A and 1B are cross-sectional views showing turned on/off conditions of an IPS mode LCD device according to the related art.
Figure 1B:
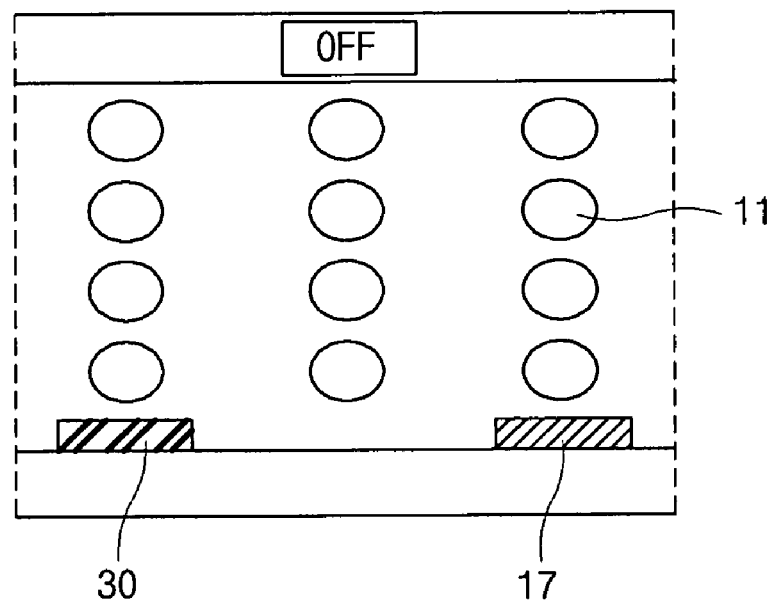
Figure 2:
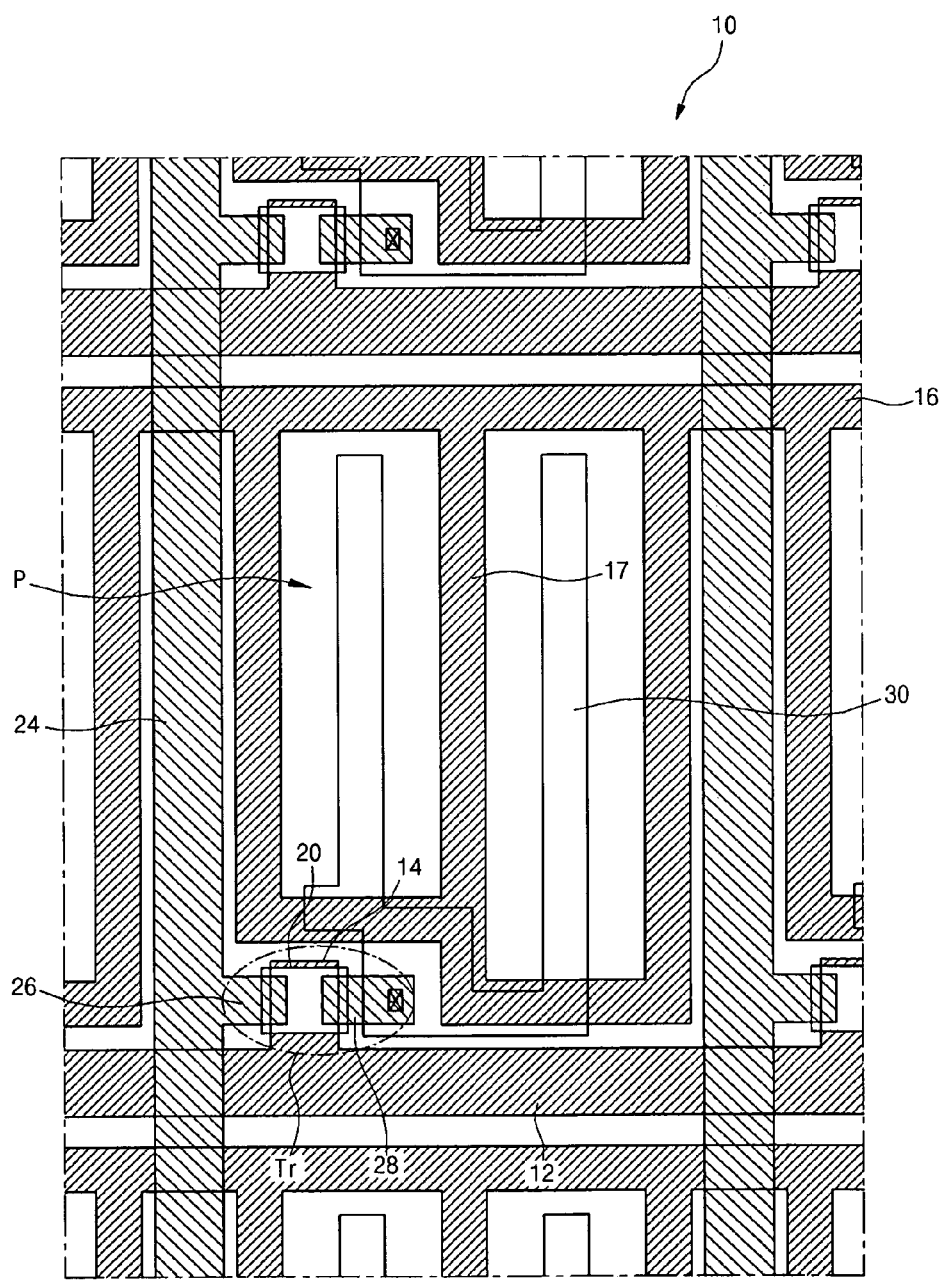
FIG. 2 is a plan view of a portion of an array substrate for the related art IPS mode LCD device.
Figure 3:
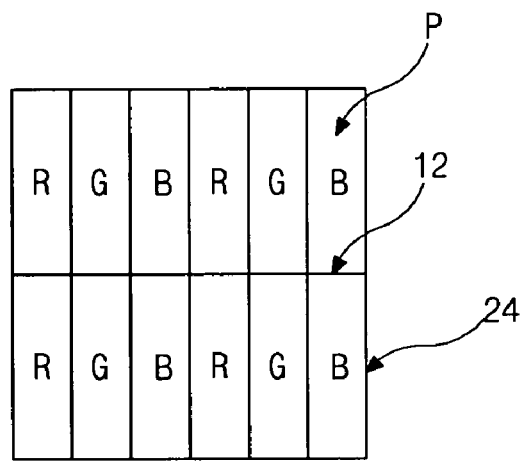
FIG. 3 is a plan view of a portion of an array substrate with color filter patterns in the related art IPS mode LCD device.
Figure 4:
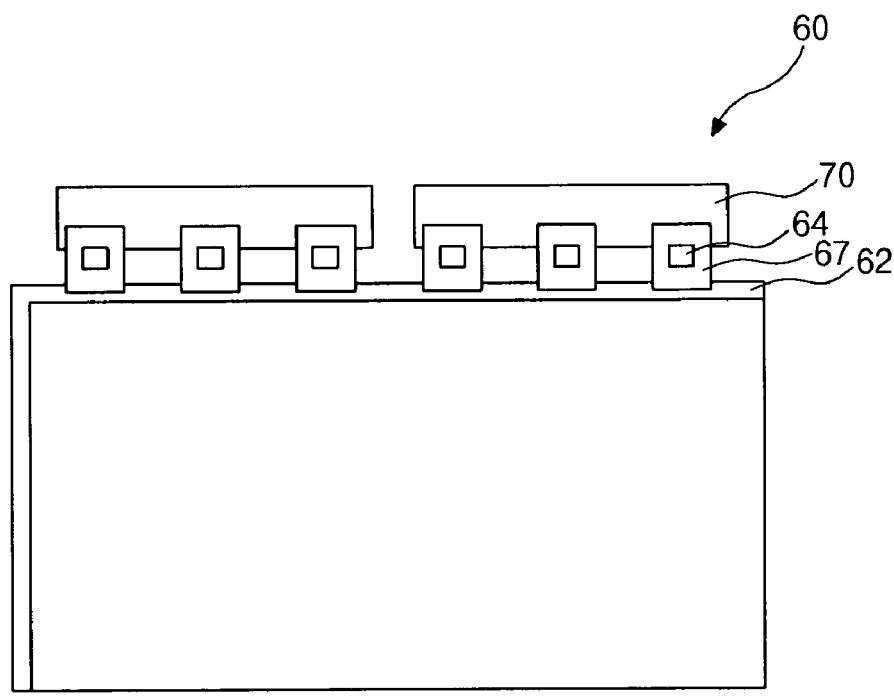
FIG. 4 is a schematic plan view showing the related art IPS mode LCD device with a driving circuit board.
Figure 5:
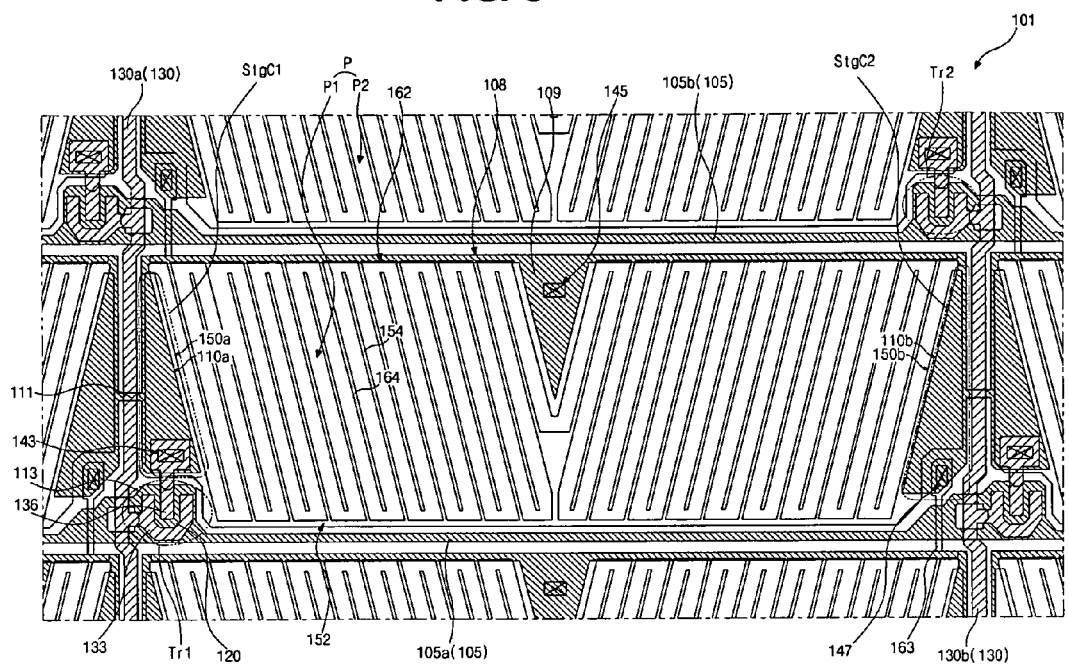
FIG. 5 is a schematic plan view a portion of an array substrate for an IPS mode LCD device according to an embodiment of the present invention.

FIG. 5 is a schematic plan view a portion of an array substrate for an IPS mode LCD device according to an embodiment of the present invention. In FIG. 5, an array substrate 101 includes first and second gate lines 105a and 105b along a horizontal direction and first and second data lines 130a and 130b crossing the first and second gate lines 105a and 105b to define first and second pixel regions P1 and P2. Explanation is focused on the first pixel region P1. A first common connection pattern 108 is formed of the same metallic material and at the same layer as each of the first and second gate lines 105a and 105b is formed in each pixel region P. The first common connection pattern 108 in the first pixel region P1 is spaced apart from the first and second gate line 105a and 105b and closer to the second gate line 105b than the first gate line 105a. A protrusion 109 protrudes from a center portion of the first common connection pattern 108 to the first gate line 105a. The protrusion 109 has a triangle shape. Alternatively, the protrusion 109 may have a trapezoid shape. The first common connection pattern 108 and the protrusion 109 in the second pixel region P2 also have the same shape and position as those in the first pixel region P1. Ends of the first common connection pattern 108 are bent along the first gate line 105a to be substantially parallel to the first and second data lines 130a and 130b, respectively, such that first and second outmost common electrodes 110a and 110b are formed in the first pixel region P1. In pixel region P1, the first outmost common electrode 110a is closer to the first data line 130a than the second data line 130b, and the second outmost common electrode 110b is closer to the second data line 130b than the first data line 130a. The first and second outmost common electrodes 110a and 110b function as a first electrode of each of the first and second storage capacitors StgC1 and StgC2. The first outmost common electrode 110a in the first pixel region P1 is connected to the second outmost common electrode in adjacent pixel region with the first data line 130a therebetween through a first connection pattern 111. In addition, the second outmost common electrode 110b in the first pixel region P1 is connected to the first outmost common electrode in adjacent pixel region along with the second data line 130b therebetween through another first connection pattern 111.

A first thin film transistor (TFT) Tr1 including a gate electrode 113, a gate insulating layer (not shown), a semiconductor layer 120, a source electrode 133 and a drain electrode 136 is formed at a crossing portion of the first gate line 105a and the first data line 130a. The semiconductor layer 120 corresponds to the gate electrode 113. The gate electrode 113 and the source electrode 133 are connected to the first gate line 105a and the first data line 130a, respectively. The drain electrode 136 is spaced apart from the source electrode 133. The source and drain electrodes 133 and 136 are disposed on the semiconductor layer 120. The drain electrode 136 of the first TFT Tr1 extends along the first data line 130a to overlap the first outmost common electrode 110a. A second TFT Tr2 connected to the second gate line 105b and the second data line 130b is formed in the second pixel region P2. Alternatively, the second TFT Tr2 may be connected to the second gate line 105b and the first data line 130a.

A passivation layer (not shown) including a drain contact hole 143, a first common contact hole 145 and a second common contact hole 147 is formed on the first TFT Tr1. The drain contact hole 143 exposes the drain electrode 136 of the first TFT Tr1, and the first and second common contact holes 145 and 147 respectively expose the protrusion 109 of the first common connection pattern 108 and the second outmost common electrode 110b.

In addition, a plurality of pixel electrodes 154 and a plurality of common electrodes 164 are formed on the passivation layer. The pixel electrodes 154 are spaced apart from each other and symmetric with respect to the protrusion 109. The common electrodes 164 are also spaced apart from each other and symmetric with respect to the protrusion 109. The pixel and common electrodes 154 and 164 are alternately arranged with each other. One end of the pixel electrodes 154 are connected to a pixel connection pattern 152. The pixel connection pattern 152 is closer to the first gate line 105a than the second gate line 105b. Ends of the pixel connection line 152 are bent to overlap the first and second outmost common electrodes 110a and 110b, respectively. A first bent portion of the pixel connection line 152 functions as a second electrode 150a of the first storage capacitor StgC1, and a second bent portion of the pixel connection line 152 functions as a second electrode 150b of the second storage capacitor StgC2. The second electrode 150a of the first storage capacitor StgC1 contacts a portion of the drain electrode 136 through the drain contact hole 143.

One end of the common electrodes 164 are connected to a second common connection pattern 162. The second common connection pattern 162 overlaps the first common connection pattern 108 and the protrusion 109. The second common connection pattern 162 includes a second connection pattern 163 extending from one end of the second common connection pattern 162. The second connection pattern 163 contacts the second outmost common electrode 110b in the second pixel region P2 through the second common contact hole 147. Namely, the second connection pattern 163 extends to cross the second gate line 105b. The common electrodes 164 and the pixel electrodes 154 are positioned between the pixel connection pattern 152 and the second common connection pattern 162.

The pixel and common electrodes 154 and 165 are oblique to the first and second data lines 130a and 130b with a predetermined angle. The pixel and common electrodes 154 and 164 at a left side with respect to the protrusion 109 are parallel to a left side surface of the protrusion 109, which has a triangle shape, while the pixel and common electrodes 154 and 164 at a right side with respect to the protrusion 109 are parallel to a right side surface of the protrusion 109. As mentioned above, the pixel and common electrodes 154 and 164 are symmetric with respect to the protrusion 109 such that a two-domain structure is obtained in one pixel region P. Since the two-domain structure is obtained without bent shape gate line or data line, a signal delay is not generated.

Figure 6:
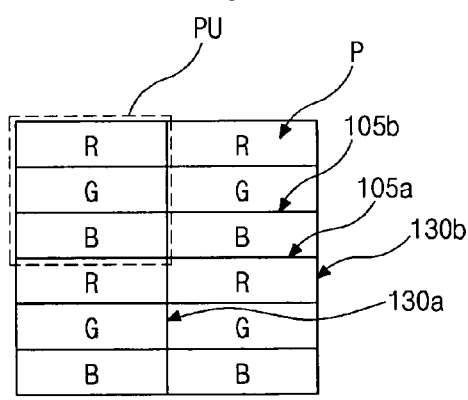
FIG. 6 is a plan view of a portion of an array substrate with color filter patterns in an IPS mode LCD device according to an embodiment of the present invention.

Referring to FIG. 6, which is a plan view of a portion of an array substrate with color filter patterns in an IPS mode LCD device according to an embodiment of the present invention, one pixel region P has a major axis along a first direction of the gate lines 105a and 105b and a minor axis along a second direction of the data lines 130a and 130b. Three pixel regions, which include a red color filter R, a green color filter G and a blue color filter B, along the second direction of the data lines 130a and 130b constitute a pixel unit PU.

Assuming that the same number of the pixel units PU is disposed in the first and second directions, since the pixel region of the array substrate for the related art IPS mode LCD device has a major axis along the second direction and a minor axis along the first direction, three pixel regions along the first direction constitute a pixel unit. Accordingly, a number of the data lines are triple as many as a number of the gate lines.

However, since the pixel region of the array substrate for the IPS mode LCD device according to the present invention has a major axis along the first direction and a minor axis along the second direction, three pixel regions along the second direction, i.e. a direction of the data lines 130a and 130b, constitute the pixel unit PU of the red, green and blue color filter patterns R, G and B. Accordingly, a number of the gate lines 130a and 130b are triple as many as a number of the data lines 130a and 130b.

The signal having the same voltage is applied to the gate lines such that a driving circuit for the gate lines is very simple. Accordingly, even if the number of the gate lines is increased, there may be no changes in the gate driving circuit. However, the data signals have different voltages depending on the number of the data lines such that a driving circuit for the data lines becomes very complicate depending on the number of the data lines. There is a limitation in a number of the data lines controlled by one driving IC chip such that a number of the FPCs are increased depending on the number of the data lines. Accordingly, when a high resolution image is required, the number of the FPCs is very rapidly increased. However, in the present invention, even if a high resolution image is required, the number of the FPCs is minimized because an increase of the data lines is minimized.

Figure 7:
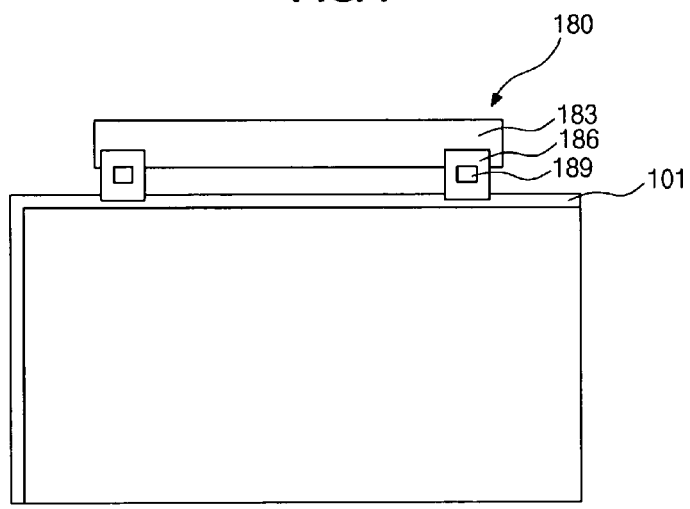
FIG. 7 is a schematic plan view showing an IPS mode LCD device according to an embodiment of the present invention with a driving circuit board.

FIG. 7 is a schematic plan view showing an IPS mode LCD device according to an embodiment of the present invention with a driving circuit board. Assuming that the IPS mode LCD device of the present invention has the same resolution as the related art IPS mode LCD device, a number of the data lines of the array substrate of the present invention is one-third of a number of the data lines of the related art array substrate. As a result, the IPS mode LCD device according to the present invention requires only two FPCs 186 each including a data driving IC chip 189 for connecting the data lines to an external driving circuit board 183. Accordingly, production cost for the IPS mode LCD device is reduced.

Figure 8:
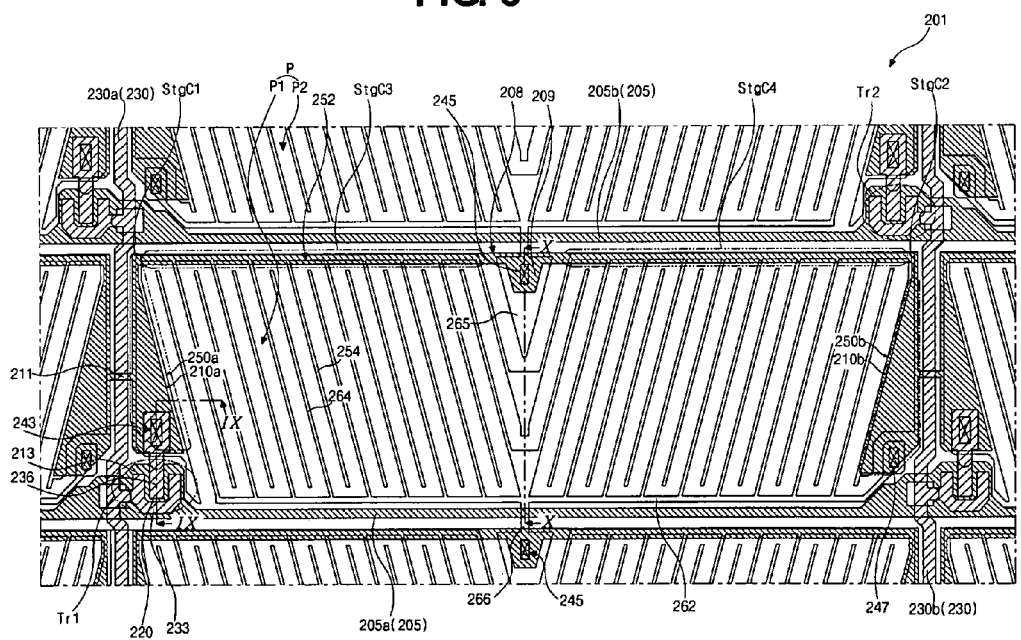
FIG. 8 is a schematic plan view a portion of an array substrate for an IPS mode LCD device according to an embodiment of the present invention.
Figure 9:
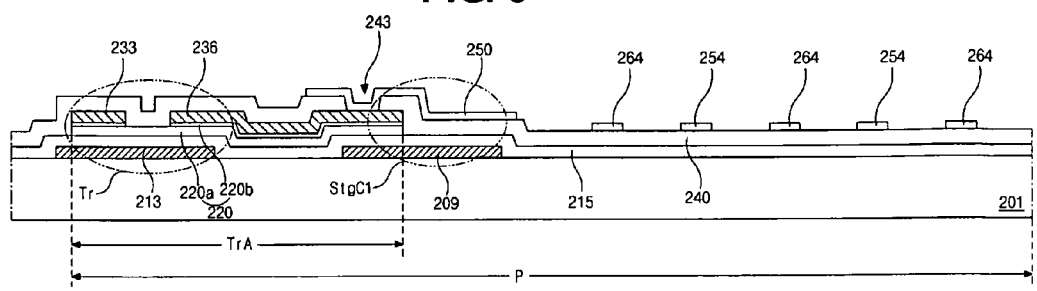
FIG. 9 is a cross-sectional view taken along the line IX-IX of FIG. 8.
Figure 10:
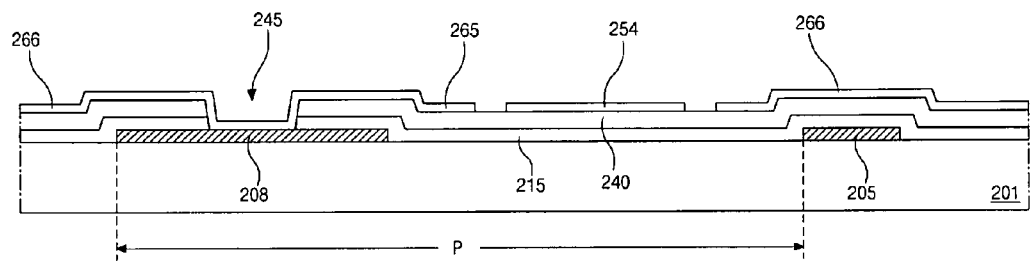
FIG. 10 is a cross-sectional view taken along the line X-X of FIG. 8.

FIG. 8 is a schematic plan view a portion of an array substrate for an IPS mode LCD device according to an embodiment of the present invention. FIG. 9 is a cross-sectional view taken along the line IX-IX of FIG. 8, and FIG. 10 is a cross-sectional view taken along the line X-X of FIG. 8.

An array substrate 201 includes first and second gate lines 205a and 205b and first and second data lines 230a and 230b crossing the first and second gate lines 205a and 205b to define first and second pixel regions P1 and P2. The first and second gate lines 205a and 205b may be extends along a horizontal direction, and the first and second data lines 230a and 230b may be extends along a vertical direction. Each of the pixel regions P1 and P2 has a major axis along a direction of the gate lines 205a and 205b and a minor axis along a direction of the data lines 230a and 230b. Explanation is focused on the first pixel region P1.

A first common connection pattern 208 is formed of the same metallic material and at the same layer as each of the first and second gate lines 205a and 205b is formed in each pixel region P. The first common connection pattern 208 in the first pixel region P1 is spaced apart from the first and second gate lines 205a and 205b and closer to the second gate line 205b than the first gate line 205a. A protrusion 209 protrudes from a center portion of the first common connection pattern 208 to the first gate line 205a. The protrusion 209 has a trapezoid shape. Alternatively, the protrusion 209 may have a triangle shape. A center portion of the first common connection pattern 208 has a larger width than other portions of the first common connection pattern 208 because of the protrusion 209. Ends of the first common connection pattern 208 are bent along the first gate line 205a to be substantially parallel to the first and second data lines 230a and 230b, respectively, such that first and second outmost common electrodes 210a and 210b are formed in the first pixel region P1. In pixel region P1, the first outmost common electrode 210a is closer to the first data line 230a than the second data line 230b, and the second outmost common electrode 210b is closer to the second data line 230b than the first data line 230a. The first and second outmost common electrodes 210a and 210b function as a first electrode of each of the first and second storage capacitors StgC1 and StgC2. The first outmost common electrode 210a in the first pixel region P1 is connected to the second outmost common electrode in adjacent pixel region with the first data line 230a therebetween through a first connection pattern 211. In addition, the second outmost common electrode 210b in the first pixel region P1 is connected to the first outmost common electrode in adjacent pixel region with the second data line 230b therebetween through another first connection pattern 211. A first portion, which is at one side of the protrusion 209, of the first common connection pattern 208 functions as a first electrode of a third storage capacitor StgC3, and a second portion, which is at the other side of the protrusion 209, of the first common connection pattern 208 functions as a first electrode of a fourth storage capacitor StgC4.

A first thin film transistor (TFT) Tr1 including a gate electrode 213, a gate insulating layer 215, a semiconductor layer 220 including an active layer 220a and an ohmic contact layer 220b, a source electrode 233 and a drain electrode 236 is formed at a crossing portion of the first gate line 205a and the first data line 230a. The gate electrode 213 and the source electrode 233 are connected to the first gate line 205a and the first data line 230a, respectively. The drain electrode 236 of the first TFT Tr1 extends along the first data line 230a to overlap the first outmost common electrode 210a. A second TFT Tr2 connected to the second gate line 205b and the second data line 230b is formed in the second pixel region P2. Alternatively, the second TFT Tr2 may be connected to the second gate line 205b and the first data line 230a.

A passivation layer 240 including a drain contact hole 243, a first common contact hole 245 and a second common contact hole 247 is formed on the first TFT Tr1. The drain contact hole 243 exposes the drain electrode 236 of the first TFT Tr1, and the first and second common contact holes 245 and 247 respectively expose the protrusion 209 of the first common connection pattern 208 and the second outmost common electrode 210b.

In addition, a plurality of pixel electrodes 254 and a plurality of common electrodes 264 are formed on the passivation layer 240. The pixel electrodes 254 are spaced apart from each other and symmetric with respect to the protrusion 209. The common electrodes 264 are also spaced apart from each other and symmetric with respect to the protrusion 209. The pixel and common electrodes 254 and 264 are alternately arranged with each other. One end of the pixel electrodes 254 are connected to a pixel connection pattern 252. The pixel connection pattern 252 is closer to the second gate line 205b than the first gate line 205a. Namely, the pixel connection pattern 252 is disposed at an upper portion of the first pixel region P1 to overlap the first and second portions of the first common connection pattern 208. A first portion of the pixel connection pattern 252 overlaps the first electrode of the third storage capacitor StgC3 to function as a second electrode of the third storage capacitor StgC3. A second portion of the pixel connection pattern 252 overlaps the second electrode of the fourth storage capacitor StgC4 to function as a second electrode of the fourth storage capacitor StgC4. The pixel connection pattern 252 does not overlap the center portion of the first common connection pattern 208 and the protrusion 209. The first overlapped portion of the first common connection pattern 208, the second overlapped portion of the pixel connection pattern 252, and a dielectric material layer of the gate insulating layer 215 and the passivation layer 240 constitute the third storage capacitor StgC3. The second overlapped portion of the first common connection pattern 208, the second overlapped portion of the pixel connection pattern 252, and a dielectric material layer of the gate insulating layer 215 and the passivation layer 240 constitute the fourth storage capacitor StgC4. In comparison to an array substrate in FIG. 5, the third and fourth storage capacitors StgC3 and StgC4 are outstanding differences of an array substrate in FIGS. 8 to 10. A common pattern 265 contacting the protrusion 209 through a first common contact hole 245 is formed.

Ends of the pixel connection line 252 are bent to overlap the first and second outmost common electrodes 210a and 210b, respectively. A first bent portion of the pixel connection line 252 functions as a second electrode 250a of the first storage capacitor StgC1, and a second bent portion of the pixel connection line 252 functions as a second electrode 250b of the second storage capacitor StgC2. The second electrode 250a of the first storage capacitor StgC1 contacts a portion of the drain electrode 236 through the drain contact hole 243.

One end of the common electrodes 264 are connected to a second common connection pattern 262. The second common connection pattern 262 is adjacent to and spaced apart from the first gate line 205a at a lower portion of the first pixel region P1. The second common connection pattern 262 includes a second connection pattern 266 branched a center portion of the second common connection pattern 262 along the first gate line 205a. The second connection pattern 266 crosses the first gate line 205a and is connected to the common pattern 265 in a lower pixel region with respect to the first pixel region P1. In addition, one end of the second common connection pattern 262 contacts the second outmost common electrode 210b through the second common contact hole 247.

The pixel and common electrodes 254 and 264 are oblique to the first and second data lines 230a and 230b with a predetermined angle. The pixel and common electrodes 254 and 264 at a left side with respect to the protrusion 209 are parallel to a left side surface of the protrusion 209, which has a triangle shape, while the pixel and common electrodes 254 and 264 at a right side with respect to the protrusion 209 are parallel to a right side surface of the protrusion 209. As mentioned above, the pixel and common electrodes 254 and 264 are symmetric with respect to the protrusion 209 such that two-domain structure is obtained in one pixel region P.

As mentioned above, since a number of FPCs including a data driving IC chip is decreased, production cost is reduced. In addition, there are the third and fourth storage capacitors StgC3 and StgC4 respectively including portions of the first common connection pattern 208 and the pixel connection pattern 252 besides the first and second storage capacitors StgC1 and StgC2, the IPS mode LCD device has a sufficient storage capacitance. Accordingly, even if the gate driving circuit is driven in a shorten frequency, the IPS mode LCD device can be normally operated due to the sufficient storage capacitance.

Moreover, since the pixel connection pattern 252 in the first pixel region P1 is spaced apart from the first gate line 205a by a distance larger than a length of a major axis of the pixel region P and smaller than a length of minor axis of the pixel region P, a parasitic capacitance between the pixel connection pattern 252 and the first gate line 205 is minimized. Accordingly, a flicker problem is efficiently prevented such that the ISP mode LCD device can display a high quality image.

A fabricating method of an array substrate for an IPS mode LCD device according to the present invention is explained with reference to FIGS. 8 to 10. Since the array substrates in FIG. 5 and in FIGS. 8 to 10 have a difference in a position of the pixel connection pattern and the second common connection pattern, the explanation is focused on the array substrate in FIGS. 8 to 10. For convenience of explanation, a switching region TrA, where a TFT is formed, is defined in the pixel region P.

First, the gate line 205 and the first common connection pattern 208 are formed on a substrate 201 by depositing and patterning a first metal layer of a first metallic material having a low resistance. The first metallic material may include aluminum (Al), Al alloy (AlNd), copper (Cu), Cu alloy, chromium (Cr) and molybdenum (Mo). In this case, the protrusion 209 protrudes from a center portion of the first common connection pattern 208. The protrusion has a triangle shape or a trapezoid shape. Ends of the first common connection pattern 208 are bent along a direction being substantially vertical the gate line 205 to form the first and second outmost common electrodes 210a and 210b. The first outmost common electrode 210a is connected to the second outmost common electrode in one adjacent pixel region through the first connection pattern 211, and the second outmost common electrode 210b is connected to the first outmost common electrode in another adjacent pixel region through another first connection pattern 211. The first connection pattern 211 is formed of the same material and at the same layer as the first and second outmost common electrodes 210a and 210b. At the same time, the gate electrode 213 connected to the gate line 205 is formed in the switching region TrA.

Next, the gate insulating layer 215 is formed on the gate line 205, the first common connection pattern 208, the first and second outmost common electrodes 210a and 210b, the gate electrode 213 and the first connection pattern 211 by depositing an inorganic insulating material, for example, silicon oxide or silicon nitride.

Next, an intrinsic amorphous silicon layer (not shown), an impurity-doped amorphous silicon layer (not shown) and a second metal layer (not shown) are sequentially formed on the gate insulating layer 215 by depositing intrinsic amorphous silicon, impurity-doped amorphous silicon and a second metallic material. The second metal layer, the impurity-doped amorphous silicon layer and the intrinsic amorphous silicon layer are patterned by a mask process using a refractive exposing method or a half-tone exposing method to form the active layer 220a, the ohmic contact layer 220b, the source electrode 233 and the drain electrode 236 in the switching region TrA. The gate electrode 213, the active layer 220a, the ohmic contact layer 220b, the source electrode 233 and the drain electrode 236 constitute the first TFT Tr1 or the second TFT Tr2.

At the same time, the data line 230, which crosses the gate line 205 to define the pixel region P and is connected to the source electrode 233, is formed on the gate insulating layer 215. The data line 230 is spaced apart from the first and second outmost common electrodes 210a and 210b by a pre-determined distance. Since the second metal layer and the intrinsic and impurity-doped amorphous silicon layers are patterned by a single mask process, a semiconductor pattern is formed under the data line 230. However, when the second metal layer is deposited and patterned after the active layer and the ohmic contact layer are formed, there is no semiconductor pattern under the data line.

Next, the passivation layer 240 is formed on the source and drain electrodes 233 and 236 and the data line 230 by depositing an inorganic insulating material, for example, silicon oxide or silicon nitride, or coating an organic insulating material, for example, benzocyclobutene (BCB) or photo-acryl. The passivation layer 240 is patterned to form the drain contact hole 243, which exposes a portion of the drain electrode 236, the first common contact hole 245, which exposes a portion of the protrusion 209, and the second common contact hole 247, which exposes a portion of the second outmost common electrode 210b.

Next, the pixel electrodes 254 and the pixel connection pattern 252 are formed on the passivation layer 240 by depositing and patterning a transparent conductive material, for example, indium-tin-oxide (ITO) or indium-zinc-oxide (IZO). The pixel connection pattern 252 is connected to the drain electrode 236 through the drain contact hole 243. The pixel electrodes 254 are branched from the pixel connection pattern 252. In other word, the pixel connection pattern 252 connects one end of the pixel electrodes 254.

At the same time, the second common connection pattern 262, the common electrodes 264, the common pattern 265 and the second connection pattern 266 are formed. The second common connection pattern 262 contacts the second outmost common electrode 210 through the second common contact hole 247. The common electrodes 264 are branched from the second common connection pattern 262 and alternately arranged with the pixel electrodes 254. The common pattern 265 contacts the protrusion 209 through the first common contact hole 245 to be connected to the first common connection pattern 208. The second connection pattern 266 connects the second common connection pattern 262 in one pixel region P to the common pattern 265 in a lower pixel region.

The first outmost common electrode 210a, one bent end of the pixel connection pattern 252 as the second electrode 250a, the gate insulating layer 215 and the passivation layer 240 constitute the first storage capacitor StgC1. The second outmost common electrode 210b, the other bent end of the pixel connection pattern 252 as the second electrode 250b, the gate insulating layer 215 and the passivation layer 240 constitute the second storage capacitor StgC2. One side of the first common connection pattern 208, one side of the pixel connection pattern 252, the gate insulating layer 215 and the passivation layer 240 constitute the third storage capacitor StgC3. The other side of the first common connection pattern 208, the other side of the pixel connection pattern 252, the gate insulating layer 215 and the passivation layer 240 constitute the fourth storage capacitor StgC4.

In FIG. 8, the pixel connection pattern 252 is positioned at an upper portion of the pixel region P, and the second common connection pattern 262 is positioned at a lower portion of the pixel region P. However, in FIG. 5, the pixel connection pattern 152 is positioned at a lower portion of the pixel region P, and the second common connection pattern 162 is positioned at an upper portion of the pixel region P. In FIG. 8, the second common connection pattern 262 is connected to the first common connection pattern in a lower pixel region. However, in FIG. 5, the second common connection pattern 162 is connected to the first common connection pattern 108 overlapping the second common connection pattern 162.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:

first and second gate lines on a substrate including first and second pixel regions;

a first common connection pattern in an upper side of each of the first and second pixel regions;

first and second outmost common electrodes extending from ends of the first common connection pattern;

a gate insulating layer on the first and second gate lines, the first common connection pattern and the first and second outmost common electrodes;

first and second data lines on the gate insulating layer and crossing the first and second gate lines to define the first and second pixel regions, the first and second pixel regions being adjacent to each other along a direction of the first and second data lines;

a thin film transistor in the first pixel region and connected to the first gate line and the first data line, the thin film transistor including a gate electrode, a semiconductor layer, a source electrode, and a drain electrode, the drain electrode extending to overlap the first outmost common electrode;

a passivation layer on the first and second data lines and the thin film transistor and including a drain contact hole exposing a portion of the drain electrode and a first common contact hole exposing a portion of the second outmost common electrode;

a plurality of pixel electrodes on the passivation layer and spaced apart from each other;

a pixel connection pattern on the passivation layer and connecting one end of the pixel electrodes, the pixel connection pattern connected to the drain electrode through the drain contact hole, the pixel connection pattern overlapping the first and second outmost common electrodes and first and second portions of the first common connection pattern;

a plurality of common electrodes on the passivation layer and alternately arranged with the pixel electrodes; and a second common connection pattern at a lower side of the pixel regions and on the passivation layer, the second common connection pattern connected to the second outmost common electrode through the first common contact hole and connecting one end of the common electrodes.

2. The substrate according to claim 1, wherein each of the first and second pixel regions has a major axis along the gate line and a minor axis along the data line.

3. The substrate according to claim 1, wherein the first outmost common electrode in the first pixel region is connected to the second outmost common electrode in a third pixel region with the first data line between the first and third pixel regions, and the second outmost common electrode in the first pixel region is connected to the first outmost common electrode in a fourth pixel region with the second data line between the first and fourth pixel regions.

4. The substrate according to claim 1, further comprising:
a protrusion protruding from a center portion of the first common connection pattern in the first pixel region extends along the first gate line;
a common pattern connected to the first common connection pattern through a second common contact hole exposing a portion of the first common connection pattern and corresponding to the center portion of the first common connection pattern; and
a second connection pattern connecting the common pattern in the first pixel region to the second common connection pattern in the second pixel region.

5. The substrate according to claim 4, wherein the protrusion has a triangle shape or a trapezoid shape.

6. The substrate according to claim 4, wherein the pixel and common electrodes at a first side with respect to the protrusion is parallel to a first side surface of the protrusion, and the pixel and common electrodes at a second side with respect to the protrusion is parallel to a second side surface of the protrusion.

7. The substrate according to claim 4, wherein the first and second portions of the first connection pattern is disposed at one and the other sides of the protrusion.

8. The substrate according to claim 1, wherein the first outmost common electrode, a first portion of the pixel connection pattern, the gate insulating layer and the passivation layer constitute a first storage capacitor, and the second outmost common electrode, a second portion of the pixel connection pattern, the gate insulating layer and the passivation layer constitute a second storage capacitor.

9. The substrate according to claim 8, wherein the first portion of the first common connection pattern, a third portion of the pixel connection pattern, the gate insulating layer and the passivation layer constitute a third storage capacitor, and the second portion of the first common connection pattern, a fourth portion of the pixel connection pattern, the gate insulating layer and the passivation layer constitute a fourth storage capacitor.

10. An array substrate for an in-plane switching mode liquid crystal display device, comprising:

first and second gate lines on a substrate including first and second pixel regions;

a first common connection pattern in an upper side of each of the first and second pixel regions;

first and second outmost common electrodes extending from ends of the first common connection pattern;

a gate insulating layer on the first and second gate lines, the first common connection pattern and the first and second outmost common electrodes;

first and second data lines on the gate insulating layer and crossing the first and second gate lines to define the first and second pixel regions, the first and second pixel regions being adjacent to each other along a direction of the first and second data lines;

a thin film transistor in the first pixel region and connected to the first gate line and the first data line, the thin film transistor including a gate electrode, a semiconductor layer, a source electrode, and a drain electrode, the drain electrode extending to overlap the first outmost common electrode;

a passivation layer on the first and second data lines and the thin film transistor and including a drain contact hole exposing a portion of the drain electrode and a first common contact hole exposing a portion of the first common connection pattern;

a plurality of pixel electrodes on the passivation layer and spaced apart from each other;

a pixel connection pattern on the passivation layer and connecting one end of the pixel electrodes, the pixel connection pattern and connected to the drain electrode through the drain contact hole, the pixel connection pattern facing the first common connection pattern such that the pixel electrodes are disposed between the pixel connection pattern and the first common connection pattern;

a plurality of common electrodes on the passivation layer and alternately arranged with the pixel electrodes; and a second common connection pattern overlapping the first common connection pattern and on the passivation layer, the second common connection pattern connecting one end of the common electrodes, the second common connection pattern connected to the first common connection pattern through the first common contact hole.

11. The substrate according to claim 10, wherein each of the first and second pixel regions has a major axis along the gate line and a minor axis along the data line.

12. The substrate according to claim 10, wherein the first outmost common electrode in the first pixel region is connected to the second outmost common electrode in a third pixel region with the first data line between the first and third pixel regions, and the second outmost common electrode in the first pixel region is connected to the first outmost common electrode in a fourth pixel region with the second data line between the first and fourth pixel regions.

13. The substrate according to claim 10, further comprising:
a protrusion protruding from a center portion of the first common connection pattern in the first pixel region extends along the first gate line; and
a second connection pattern connecting the second common connection pattern in the first pixel region to the second outmost common electrode in the second pixel region through a second common contact hole in the passivation layer.

14. The substrate according to claim 13, wherein the protrusion has a triangle shape or a trapezoid shape.

15. The substrate according to claim 13, wherein the pixel and common electrodes at a first side with respect to the protrusion is parallel to a first side surface of the protrusion, and the pixel and common electrodes at a second side with respect to the protrusion is parallel to a second side surface of the protrusion.

16. The substrate according to claim 10, wherein the first outmost common electrode, a first portion of the pixel connection pattern, the gate insulating layer and the passivation layer constitute a first storage capacitor, and the second outmost common electrode, a second portion of the pixel connection pattern, the gate insulating layer and the passivation layer constitute a second storage capacitor.

* * * * *